US012241635B2

(12) United States Patent
Mergener et al.

(10) Patent No.: US 12,241,635 B2
(45) Date of Patent: Mar. 4, 2025

(54) RETRACTABLE RANGE HOOD

(71) Applicant: Broan-NuTone LLC, Hartford, WI (US)

(72) Inventors: Bradley Mergener, Hartford, WI (US); Ryan Revers, Hartford, WI (US); Richard R. Sinur, Hartford, WI (US); Brian Wellnitz, Hartford, WI (US); Brent Lillesand, Hartford, WI (US); Jason Asmus, Hartford, WI (US)

(73) Assignee: Broan-NuTone LLC, Hartford, WI (US)

( * ) Notice: Subject to any disclaimer, the term of this patent is extended or adjusted under 35 U.S.C. 154(b) by 364 days.

(21) Appl. No.: 17/701,739

(22) Filed: Mar. 23, 2022

(65) Prior Publication Data

US 2022/0307700 A1 Sep. 29, 2022

Related U.S. Application Data

(60) Provisional application No. 63/166,582, filed on Mar. 26, 2021.

(51) Int. Cl.
*F24C 15/20* (2006.01)
*H05B 6/64* (2006.01)

(52) U.S. Cl.
CPC ...... *F24C 15/2092* (2013.01); *F24C 15/2042* (2013.01); *H05B 6/6423* (2013.01)

(58) Field of Classification Search
CPC . F24C 15/2092; F24C 15/2042; H05B 6/6423
USPC ........................................................ 126/21 R
See application file for complete search history.

(56) References Cited

U.S. PATENT DOCUMENTS

| | | | |
|---|---|---|---|
| 6,686,576 | B1 | 2/2004 | Yang |
| 6,992,273 | B2 | 1/2006 | Yim et al. |
| 7,098,432 | B2 | 8/2006 | Rew et al. |
| 8,066,000 | B2 | 11/2011 | Tsakiris |
| 8,272,377 | B2 | 9/2012 | Tsakiris |
| 8,410,411 | B2 | 4/2013 | Song et al. |
| 8,658,954 | B2 | 2/2014 | Song et al. |
| 9,175,862 | B2 | 11/2015 | Chtchetinin |
| 9,307,582 | B2 | 4/2016 | Yu et al. |
| 9,526,131 | B2 | 12/2016 | Kim et al. |

(Continued)

FOREIGN PATENT DOCUMENTS

CA 2629854 C 11/2012

OTHER PUBLICATIONS

LG 2.0 cu.ft. Over the Range Microwave with 2nd Generation Slide-Out ExtendaVent and EasyClean Interior; Jun. 2014 (2 pages).

(Continued)

*Primary Examiner* — Avinash A Savani
(74) *Attorney, Agent, or Firm* — Barnes & Thornburg LLP

(57) ABSTRACT

A range hood for a microwave includes a range-hood mount and a pair of hood slides coupled to the range-hood mount. Each hood slide includes portions that are configured to move relative to the range-hood mount between a retracted position and an extended position. The range hood further includes an expandable hood extension coupled to the pair of slides and configured to move from a collapsed configuration, when the pair of slides are arranged in the retracted position, to an expanded configuration, when the pair of slides are in the extended position.

17 Claims, 14 Drawing Sheets

(56) References Cited

U.S. PATENT DOCUMENTS

| | | | | |
|---|---|---|---|---|
| 9,713,204 | B2 | 7/2017 | Kim et al. | |
| 10,088,171 | B2 | 10/2018 | Lee et al. | |
| 10,890,335 | B2 | 1/2021 | Kim et al. | |
| 2008/0264933 | A1 * | 10/2008 | Jeong | F24C 15/2092 219/757 |
| 2017/0063290 | A1 * | 3/2017 | Kurlagunda | B60L 8/003 |

OTHER PUBLICATIONS

MicroVisor Removable Mini Hood Extension for Microwave OTR; 2022 (7 pages).

* cited by examiner

RETRACTABLE RANGE HOOD

PRIORITY CLAIM

This application claims priority under 35 U.S.C. § 119(e) to U.S. Provisional Application Ser. No. 63/166,582, filed Mar. 26, 2021, which is expressly incorporated by reference herein.

BACKGROUND

The present disclosure relates to a hood, and particularly to a range hood. More particularly, the present disclosure relates to a range hood that is that is attachable to an exhaust fan or a device with an exhaust fan.

SUMMARY

According to the present disclosure, a range hood includes a range-hood mount configured to couple to at least one of a microwave and a structure adjacent to the microwave. The range hood may further include a pair of hood slides coupled to the range-hood mount, a portion of each hood slide being configured to move relative to the range-hood mount between a retracted position and an extended position. The range hood may further include an expandable hood extension coupled to the pair of hood slides and configured to move from a collapsed configuration, when the pair of hood slides are arranged in the retracted position, to an expanded configuration, when the pair of hood slides are in the extended position.

In some embodiments, the microwave includes at least one vent inlet and the expandable hood extension is offset from the vent inlet in both the collapsed configuration and the expanded configuration. In some embodiments, the expandable hood extension includes a plurality of panels that are stacked on top of one another in the collapsed configuration and that are at least partially offset relative to one another so as to be shiplapped in the expanded configuration.

In some embodiments, each of the hood slides includes a stationary rail mounted on the range-hood mount, a movable rail engaged with the stationary rail and configured to move relative to the stationary rail between the retracted and extended positions, and a panel holder coupled to the movable rail for movement therewith and coupled to the plurality of panels to control movement of the plurality of panels between the collapsed and expanded configurations.

In some embodiments, some of the panels move relative to panel holders as the expandable hood extension changes from the collapsed configuration to the expanded configuration. In some embodiments, each panel holder is formed to define one or more slots that retain ends of the panels.

In some embodiments, each panel holder includes a first slot that receives an end of a first panel included in the plurality of panels and a second slot that receives an end of a second panel included in the plurality of panels. In some embodiments, the first slot is sized to limit movement of the first panel relative to the panel holder so that the first panel moves with the panel holder as the hood slides change from the retracted position to the extended position and the second slot is sized to allow the panel holder to move relative to the second panel such that the end of the second panel travels through the second slot as the hood slides change from the retracted position to the extended position.

In some embodiments, the expandable hood extension has a first width in the collapsed configuration and a second width in the expanded configuration, the second width being greater than the first width. In some embodiments, the microwave includes at least one vent inlet and the range-hood mount defines a central aperture configured to avoid blocking the vent inlet.

In accordance with another aspect of the present disclosure, a range hood includes a range-hood mount, a hood slide, and an expandable hood extension. The hood slide is coupled to the range-hood mount. A portion of the hood slide is configured to move relative to the range-hood mount between a retracted position and an extended position. The expandable hood extension is coupled to the hood slide and is configured to move from a collapsed configuration, when the hood slide is arranged in the retracted position, to an expanded configuration, when the hood slide is in the extended position.

In some embodiments, the range hood includes at least one vent inlet and the expandable hood extension is offset from the vent inlet in both the collapsed configuration and the expanded configuration. In some embodiments, the expandable hood extension includes a plurality of panels that are stacked on top of one another in the collapsed configuration and that are at least partially offset relative to one another so as to be shiplapped in the expanded configuration.

In some embodiments, the hood slide includes a stationary rail mounted on the range-hood mount, a movable rail engaged with the stationary rail and configured to move relative to the stationary rail between the retracted and extended positions, and a panel holder coupled to the movable rail for movement therewith and coupled to the plurality of panels to control movement of the plurality of panels between the collapsed and expanded configurations.

In some embodiments, some of the panels move relative to panel holder as the expandable hood extension changes from the collapsed configuration to the expanded configuration. In some embodiments, the panel holder is formed to define one or more slots that retain the panels.

In some embodiments, the panel holder includes a first slot that receives a first panel included in the plurality of panels and a second slot that receives a second panel included in the plurality of panels. In some embodiments, the first slot is sized to limit movement of the first panel relative to the panel holder so that the first panel moves with the panel holder as the hood slide changes from the retracted position to the extended position and the second slot is sized to allow the panel holder to move relative to the second panel such that the second panel travels through the second slot as the hood slide changes from the retracted position to the extended position.

In some embodiments, the expandable hood extension has a first width in the collapsed configuration and a second width in the expanded configuration, the second width being greater than the first width.

In accordance with another aspect of the present disclosure, a range hood includes a range-hood mount and an expandable hood extension coupled to the range-hood mount and configured to move from a collapsed configuration to an expanded configuration. In some embodiments, the expandable hood extension has a first width in the collapsed configuration and a second width in the expanded configuration, the second width being greater than the first width.

In some embodiments, the expandable hood extension includes a plurality of panels that are stacked on top of one another in the collapsed configuration and that are at least partially offset relative to one another so as to be shiplapped in the expanded configuration. In some embodiments, the range hood further includes a pair of hood slides, each hood slide including a stationary rail mounted on the range-hood mount, a movable rail engaged with the stationary rail and configured to move relative to the stationary rail between the retracted and extended positions, and a panel holder coupled to the movable rail for movement therewith and coupled to the plurality of panels to control movement of the plurality of panels between the collapsed and expanded configurations.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 2:
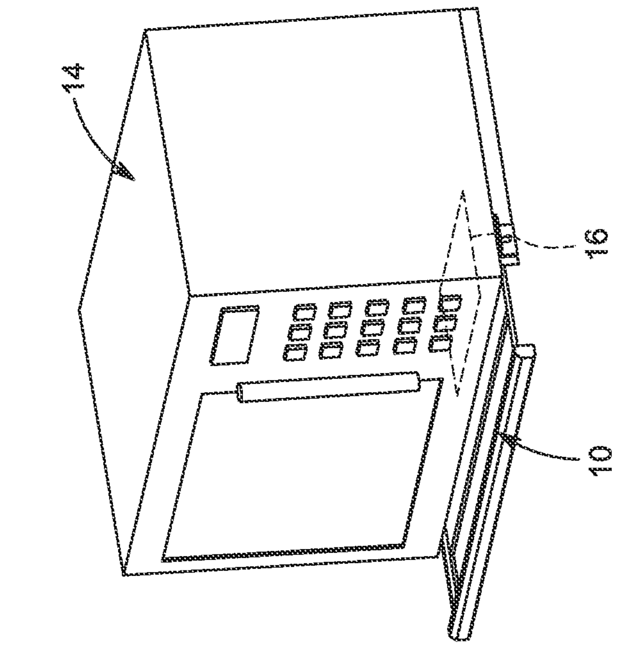
FIG. 2 is a perspective view of the microwave and the range hood showing the range hood expanded to increase a capture area of the range hood so that more effluents produced while cooking food, for example, are vented through the vent inlet.
Figure 1:
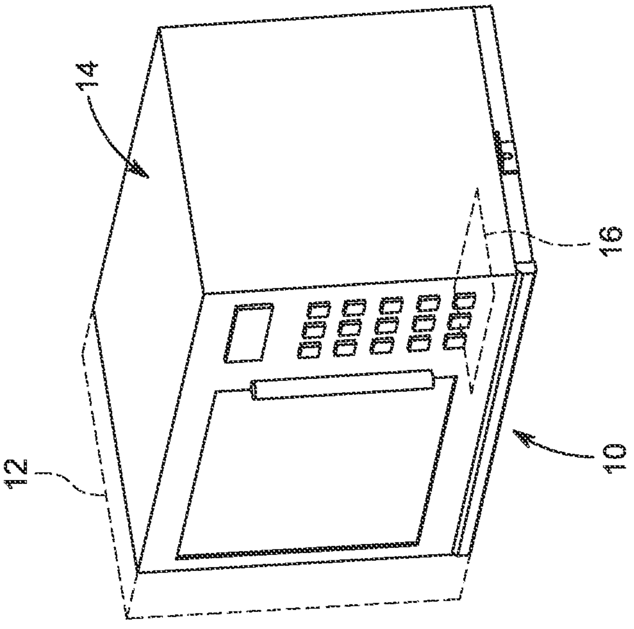
FIG. 1 is a perspective view of a microwave and a range hood coupled to the microwave for collecting effluents below the microwave and the range hood and for directing the effluents toward a vent inlet.

A range hood 10 in accordance with the present disclosure is configured to be attached removably to cabinetry 12, a microwave 14, or another structure around the microwave 14 as shown in FIGS. 1 and 2. The range hood 10 is arranged below the microwave 14 and is configured to capture and direct effluents toward a vent inlet 16 included in the microwave 14. The range hood 10 is expandable to increase a capture area of the range hood 10 so that more effluents produced while cooking food, for example, are vented through the vent inlet 16 of the microwave as shown in FIG. 2. In some embodiments, the range hood 10 is not placed beneath a microwave 14 and instead includes its own vent inlet 16 for venting effluents.

The range hood 10 is separate from the microwave 14 such that the range hood 10 may be retrofitted with microwave 14 after installation of the microwave 14. The range hood 10 has a rectangular profile to match the microwave 14. In the illustrative embodiment, the range hood 10 has similar length and width dimensions to the microwave 14 to provide a uniform aesthetic overall appearance with the microwave 14 when the range hood 10 is in a retracted configuration as shown in FIG. 1. The range hood 10 may optionally be made from a similar material, color and/or finish as the microwave 14 (e.g. stainless steel) for uniform aesthetics. In other embodiments, the range hood 10 may be sized with any length, width, and height dimensions to be attached to any sized microwave 14 and may include any suitable material matched or unmatched with the microwave 14.

Figure 3:
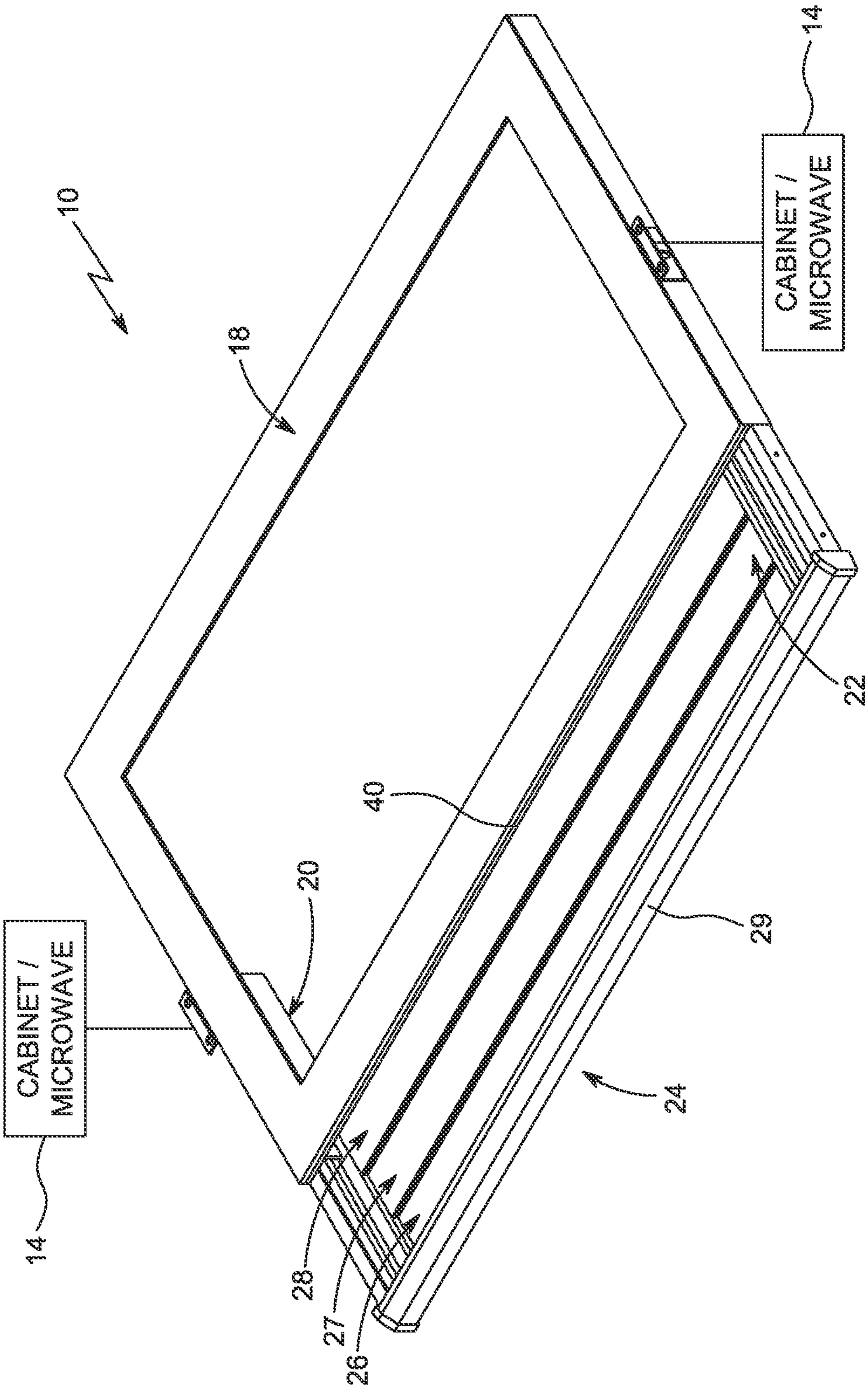
FIG. 3 is a perspective and diagrammatic view of the range hood from FIGS. 1 and 2.
Figure 4:
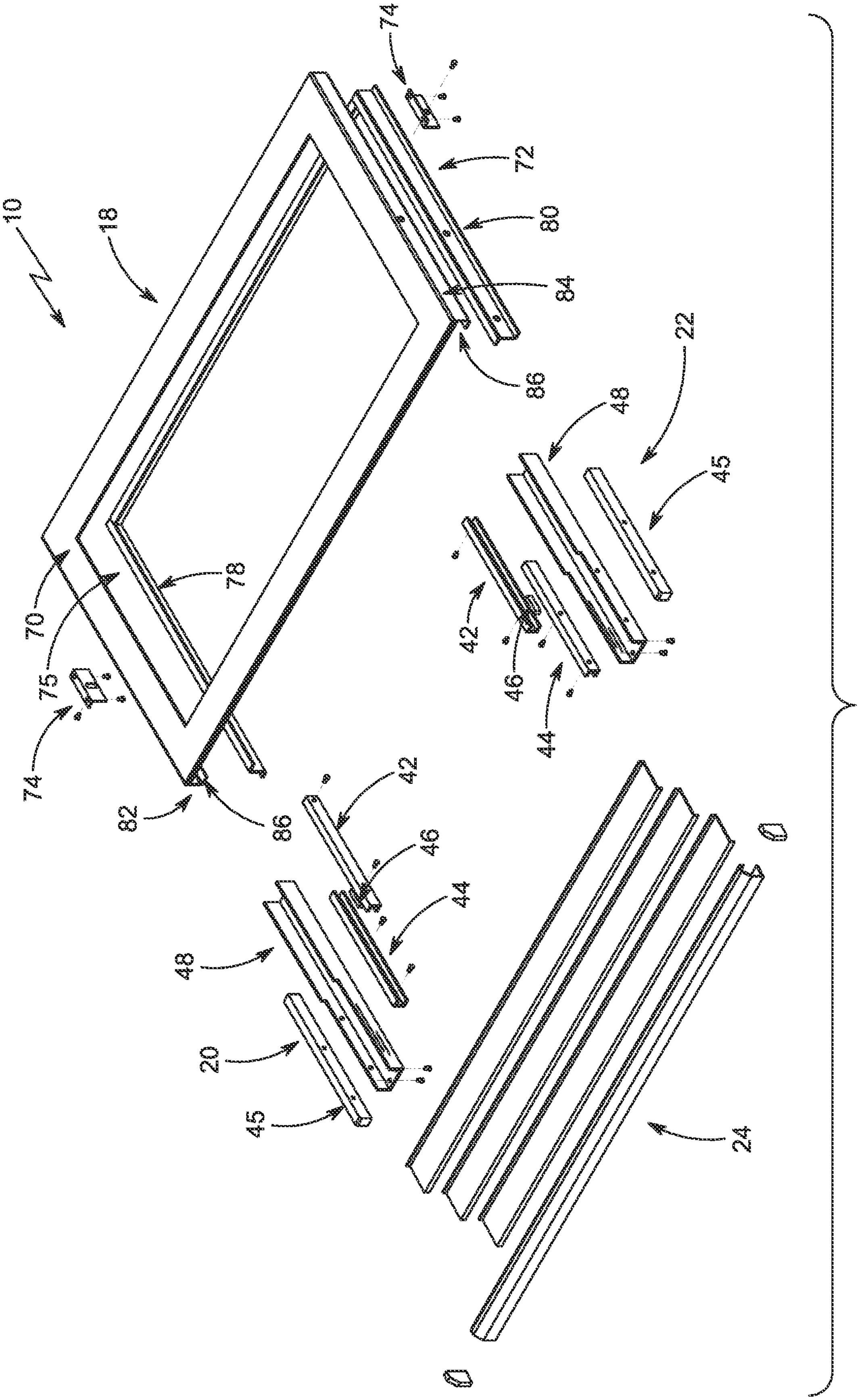
FIG. 4 is an exploded view of the range hood from FIG. 3.

The range hood 10 is configured to be moved from the retracted configuration as shown in FIG. 1, to an expanded configuration, as shown in FIG. 2, to improve the capture of effluents from food being cooked on front burners of a stove range (not shown) located below the microwave 14, for example. Testing has shown that the effluents rising from a range flow upwards and around the front of the microwave. This is especially true for the front burners of a range. The range hood 10 includes range-hood mount 18, a pair of hood slides 20, 22 coupled to the range-hood mount 18, and an expandable hood extension 24 as shown in FIGS. 3 and 4. The range-hood mount 18 is configured to mount to at least one of cabinetry 12, the microwave 14, or another structure around the microwave to position the range hood 10 relative to the vent inlet 16. The pair of hood slides 20, 22 are coupled on the range-hood mount 18 and each include portions that move relative to the range-hood mount 18 between a retracted position and an extended position. The expandable hood extension 24 is coupled to the pair of slides 20, 22 and moves with the portions of the slides 20, 22 between the retracted position and the extended position. The expanded hood extension 24 prevents the effluents from flowing around the front of the microwave 14, as previously discussed.

Figure 5:
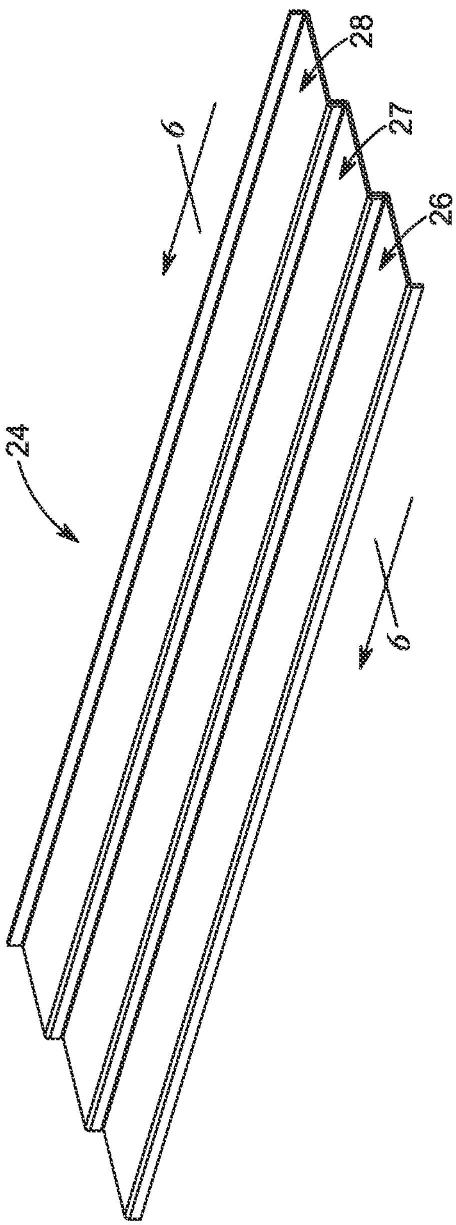
FIG. 5 is a perspective view of an expandable hood extension of the range hood of FIGS. 1-4.
Figure 7:
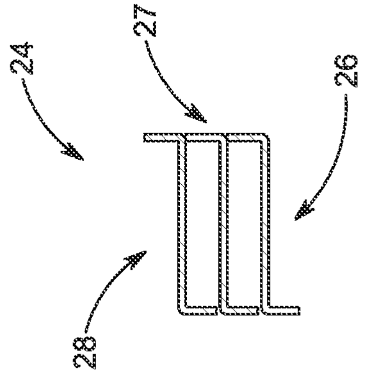
FIG. 7 is a cross sectional view of the expandable hood extension of FIG. 5 in a collapsed-storage configuration.
Figure 6:
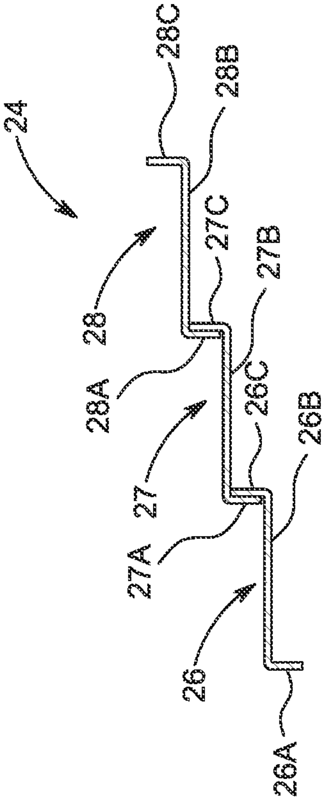
FIG. 6 is a cross-sectional view of the expandable hood extension taken along line 6-6 in FIG. 5 showing the expandable hood extension in an expanded configuration.
Figure 8:
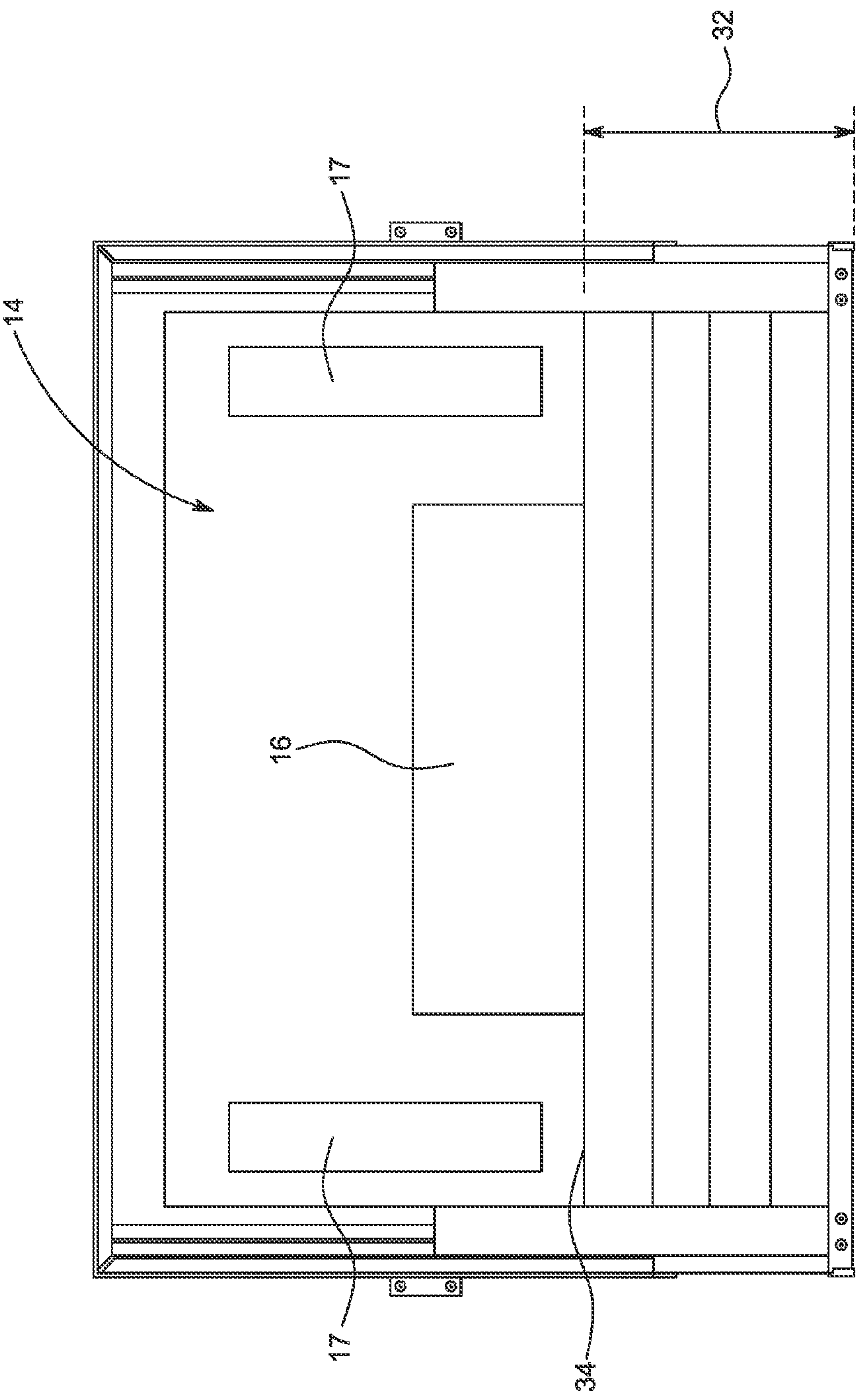
FIG. 8 is bottom plane view of the microwave and the range hood of FIG. 1 showing the range hood positioned relative to a vent inlet and in the expanded configuration.
Figure 9:
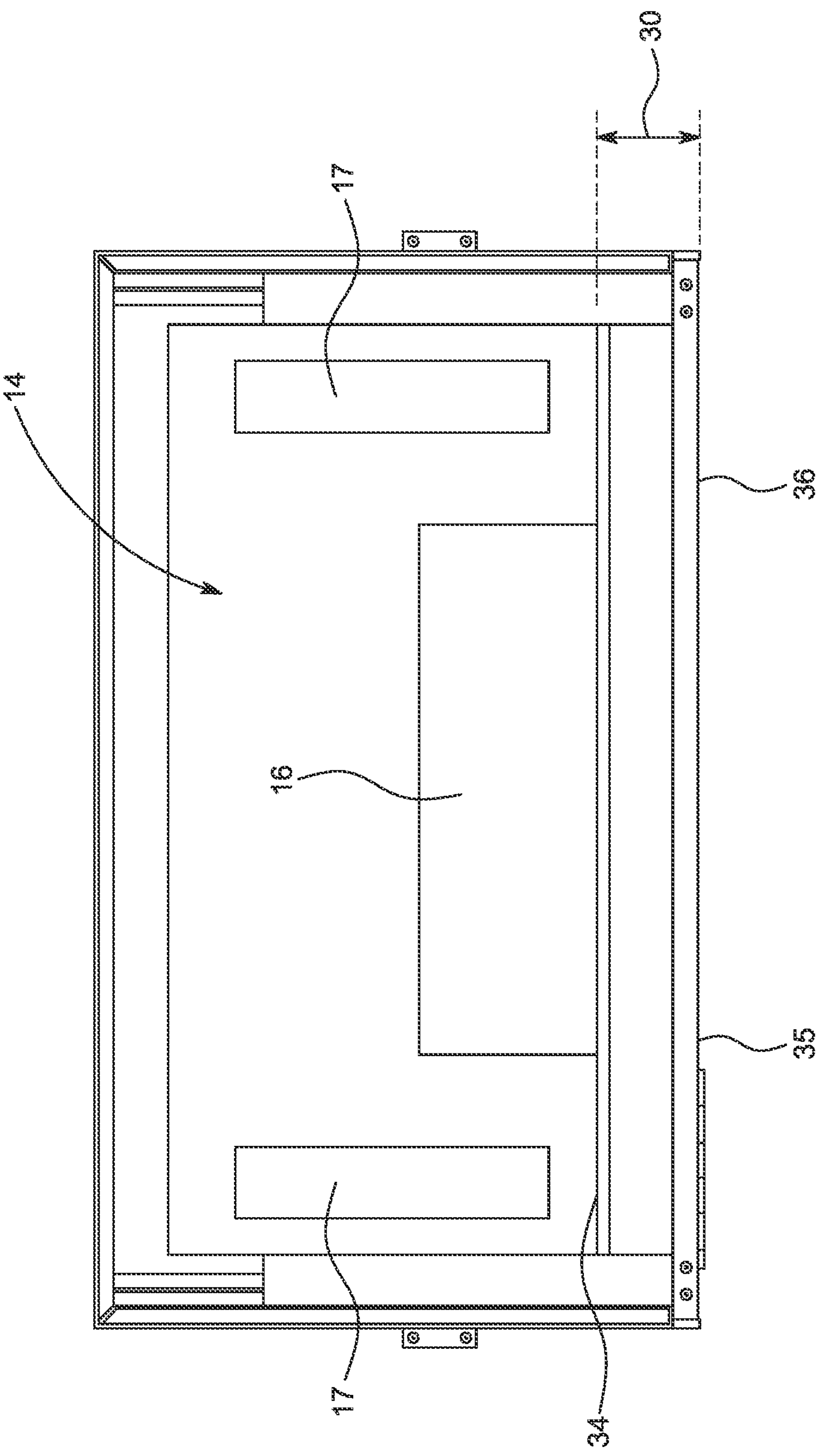
FIG. 9 is a bottom plane view similar to FIG. 8 showing the range hood in the collapsed-storage configuration.
Figure 10:
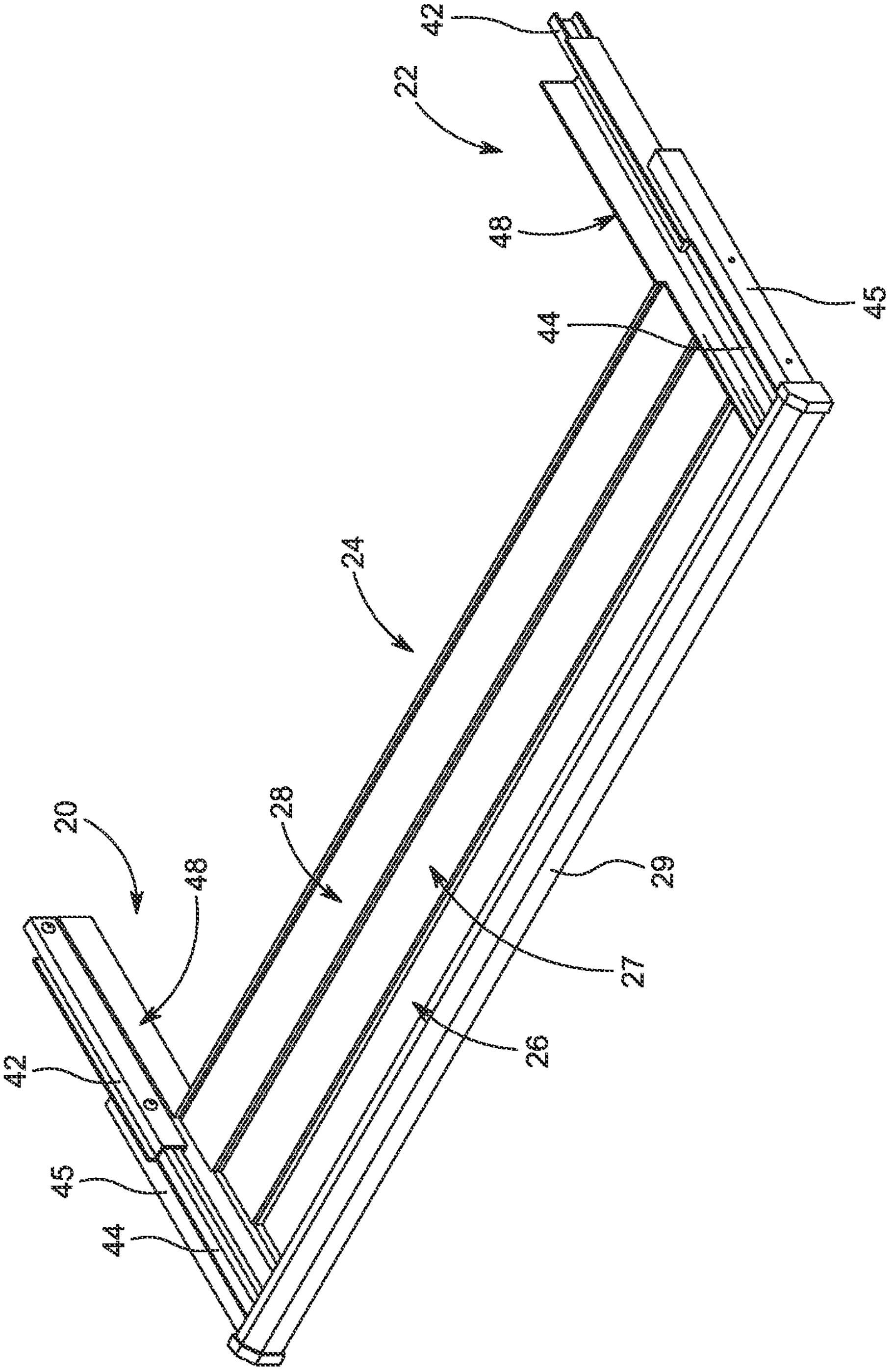
FIG. 10 is a perspective view of the range hood of FIG. 1 with portions removed to show a pair of hood slides.

As the portions of the hood slides 20, 22 move from the retracted position to the expanded position, the expandable hood extension 24 changes from a collapsed configuration, as shown in FIGS. 7 and 9, to an expanded configuration, as shown in FIGS. 5, 6 and 8. The expandable hood extension 24 includes a plurality of panels 26, 27, 28 that extend between and interconnect the hood slides 20, 22. The plurality of panels 26, 27, 28 are at least partially offset from one another in the expanded configuration so as to be shiplapped relative to one another. The plurality of panels 26, 27, 28 are stacked vertically relative to one another when the expandable hood extension 24 is in the collapsed configuration. The expandable hood extension 24 further includes a handle crossbeam 29 that extends between the pair of hood slides 20, 22 and which a user can grip to pull the hood expandable extension 24 to change from the collapsed configuration to the expanded configuration.

The expandable hood extension 24 is offset from the microwave vent inlet 16 of the microwave 14 in both the collapsed configuration and the expanded configuration so that the microwave's venting functions can be used at all times as shown in FIGS. 8 and 9 without any obstruction from the hood extension. Hoods of the prior art obstruct the microwaves venting function when collapsed or need additional vent openings. The expandable hood section eliminates the need for additional vent openings as well as obstructions. Forming the expandable hood extension 24 with a plurality of panels 26, 27, 28 allows a width of the expandable hood extension 24 to be minimized in the collapsed configuration while also allowing the expandable hood extension to expand to a larger width in the expanded configuration. The expandable hood extension 24 has a first width 30 in the collapse configuration and a second width 32 in the expanded configuration. The second width 32 is greater than the first width 30. The expandable hood extension 24 is positioned relative to the range-hood mount 18 so that a rearmost edge 34 of the hood extension does not overlap with or block the microwave vent inlet 16 or any lights 17 that the microwave 14 may have. Stated differently, the range hood mount 18 defines a central aperture 75 configured to avoid overlapping or otherwise covering the microwave vent inlet 16 or any microwave lights 17. As a result, additional lighting is not needed on the hood extension 24. The hood extension 24 may also be positioned relative to the range-hood mount 18 so that a forwardmost edge 36 of the hood extension 24 does not protrude outwardly past a forwardmost edge 35 of the microwave 14 when the hood extension 24 is in the collapsed configuration. Although the hood extension 24 is illustratively embodied as having only three panels 26, 27, 28, it should be appreciated that any number of panels may be included in the hood extension 24.

Each of the plurality of panels 26, 27, 28 includes a forward lip 26A, 27A, 28A as shown in FIGS. 6 and 7. Each of the plurality of panels 26, 27, 28 further includes a panel body 26B, 27B, 28B extending from each respective forward lip 26A, 27A, 28A. Each of the plurality of panels 26, 27, 28 further includes a rearward lip 26C, 27C, 28C extending from the respective panel body 26B, 27B, 28B and spaced apart from each respective forward lip 26A, 27A, 28A. Each forward lip 26A, 27A, 28A extends downwardly away from each respective panel body 26B, 27B, 28B. Each rearward lip 26C, 27C, 28C extends upwardly away from each respective panel body 26B, 27B, 28B.

In the expanded configuration, the forward and rearward lips 26A, 27A, 28A, 26C, 27C, 28C engage portions of one another, the handle crossbeam 29, and the range-hood mount 18 so that the panels 26, 27, 28 are moved to the expanded configuration and are shiplapped relative to one another. Panel 26 is coupled to at least one of the handle crossbeam 29 and the pair of hood slides 20, 22 for movement therewith as the hood slides 20, 22 change from the retracted position to the extended position. The rearward lip 26C engages the forward lip 27A so that panel 26 pulls panel 27 as the hood slides 20, 22 change from the retracted position to the extended position. The rearward lip 27C then engages the forward lip 28A so that panel 27 pulls panel 28 as the hood slides 20, 22 change from the retracted position to the extended position. The rearward lip 28C engages a lip 40 formed on the range-hood mount 18 to stop the hood slides 20, 22 and the expandable hood extension 24 from further extension once the expandable hood extension 24 reaches the expanded configuration.

Each of the slides 20, 22 includes a stationary rail 42 mounted on the range-hood mount 18 and a movable rail 44 engaged with the stationary rail 42 and configured to move relative to the stationary rail 42 between the retracted and extended positions. A bearing unit 46 may be arranged between the stationary rail 42 and the movable rail 44 to reduce friction there between. Each movable rail 44 is coupled a corresponding panel holder 48 as shown in FIGS. 4 and 10-13. The plurality of panels 26, 27, 28 are coupled to the panel holders 48, as further described below, for movement therewith. Some of the panels 27, 28 also move relative to panel holders 48 as the expandable hood extension 24 changes from the collapsed configuration to the expanded configuration.

Figure 11:
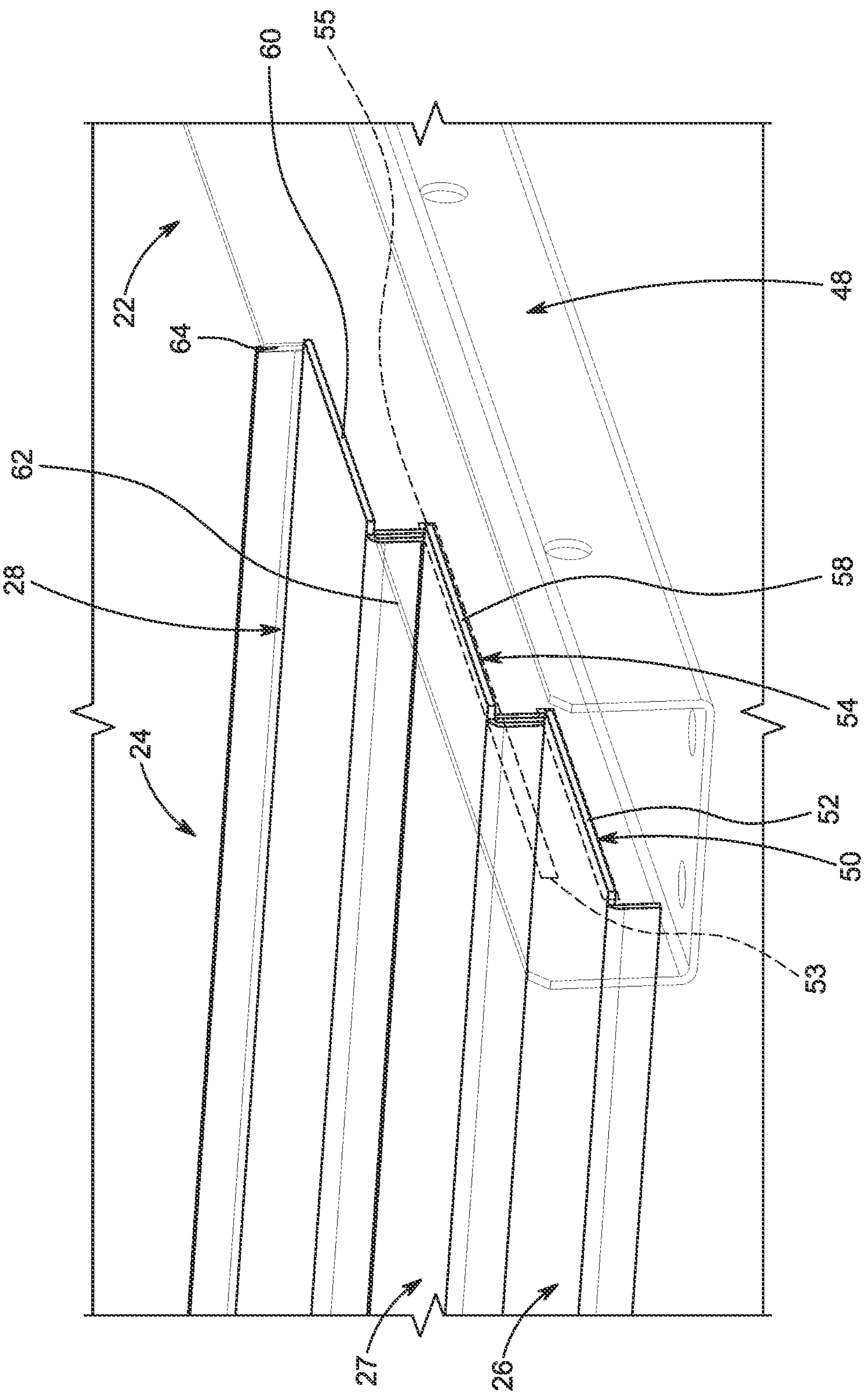
FIG. 11 is an enlarged view of a portion of FIG. 10 showing portions of the expandable hood extension received in slots formed in the hood slides to control expansion and retraction of the expandable hood extension.
Figure 12:
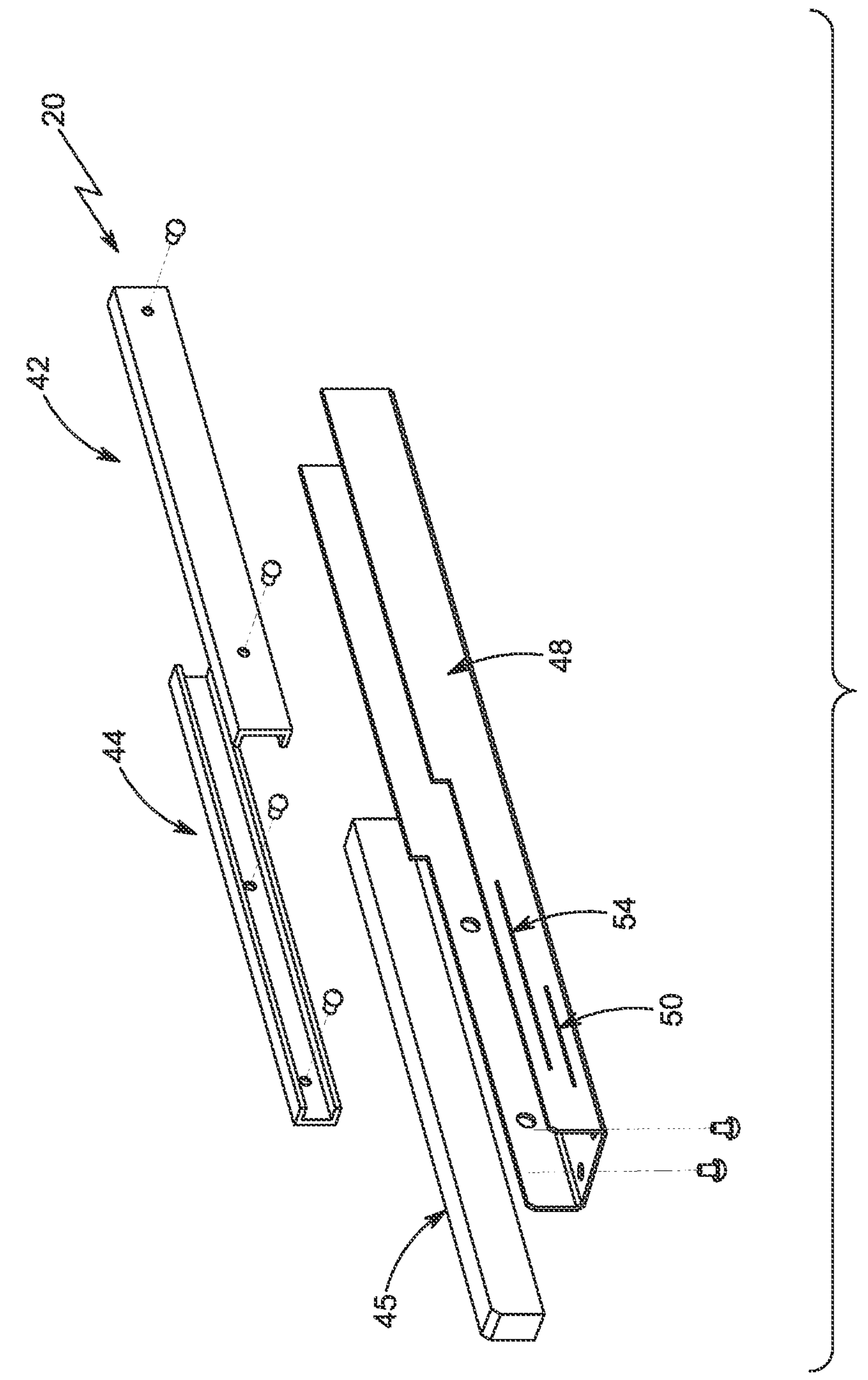
FIG. 12 is an exploded view of one of the hood slides of FIG. 11.
Figure 13:
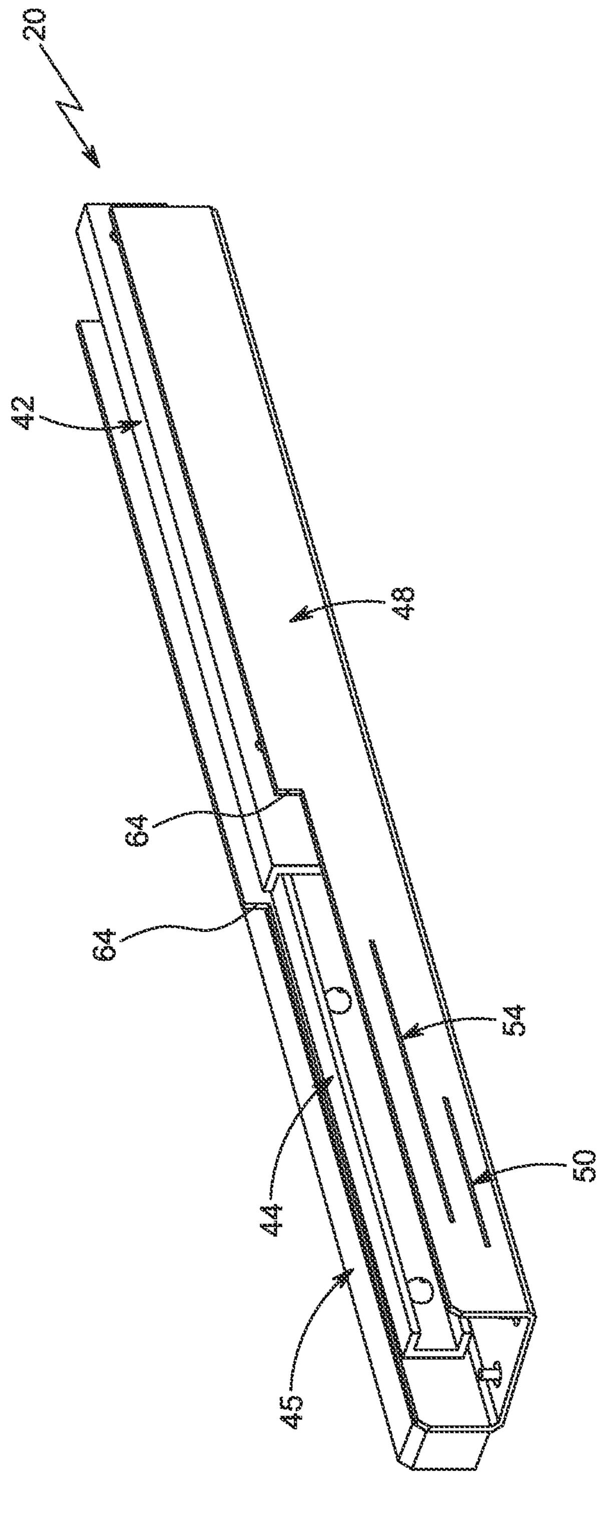
FIG. 13 is a perspective view of the hood slide shown in FIG. 12.
Figure 14:
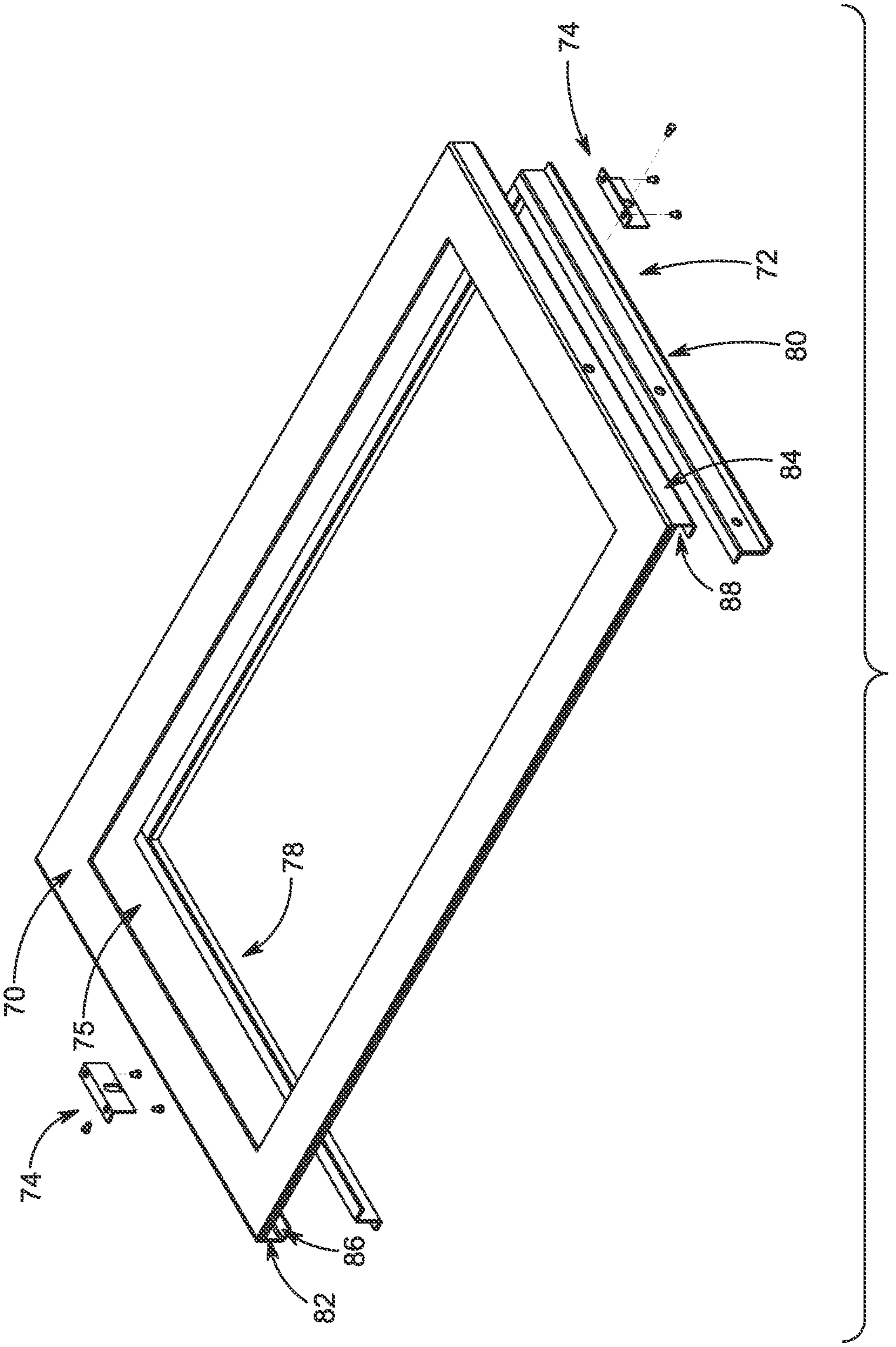
FIG. 14 is an exploded view of a range hood mount of the range hood of FIGS. 1-4.

Each panel holder 48 is formed to define one or more slots that retain ends of the panels 26, 27, 28 as shown in FIGS. 11-13. In the illustrative embodiment, each panel holder 48 includes a first slot 50 that receives an end 52 of panel 26 and a second slot 54 that receives an end 58 of panel 27. The first slot 50 is sized to correspond to a width of panel 26 to limit movement of panel 26 relative to panel holder 48 so that panel 26 moves with panel holder 48 as the hood slides 20, 22 change from the retracted position to the extended position. The second slot 54 is sized to allow panel holder 48 to move relative to panel 27 such that the end 58 of panel 27 travels through slot 54 as the hood slides 20, 22 change from the retracted position to the extended position until panel 27 contacts an end 53, 55 of slot 54. An end 60 of panel 28 rests on an upper surface 62 of panel holder 48. Panel 28 may freely move relative to panel holder 48 as the hood slides 20, 22 change from the retracted position to the extended position until the end 60 of panel 28 contacts a stop 64 of the panel holder 48 in the expanded configuration. The stop 64 of the panel holder 48 is also configured to contact lip 40 of range-hood mount 18 to block further extension of the hood slides 20, 22 and the hood extension 24 relative to the range-hood mount 18.

The range-hood mount 18 includes a mount base 70, a slide reinforcement unit 72 coupled to the mount base 70 and a pair of mount brackets 74 coupled to the mount base 70. The mount base 70 defines the central window 75 to allow airflow and effluents to flow there through to vent inlet 16. The mount brackets 74 are coupled to flanges 82, 84 included in mount base 70 and are configured to be attached to the microwave 14 or the cabinet 12 to mount the range hood 10 thereto. The slide reinforcement unit 72 includes flanges 78, 80 that support rails 42, 44 to limit movement of the slides 20, 22 and the hood extension 24 relative to range-hood mount 18 other than sliding movement between the extended and retracted positions. Passageways 86, 88 are defined between flanges 78, 82 and flanges 80, 84, respectively, to receive and support guides 45 included in each slide 20, 22. The flanges 78, 80 also provide locations to which the stationary rails 42 are mounted.

Figure 15:
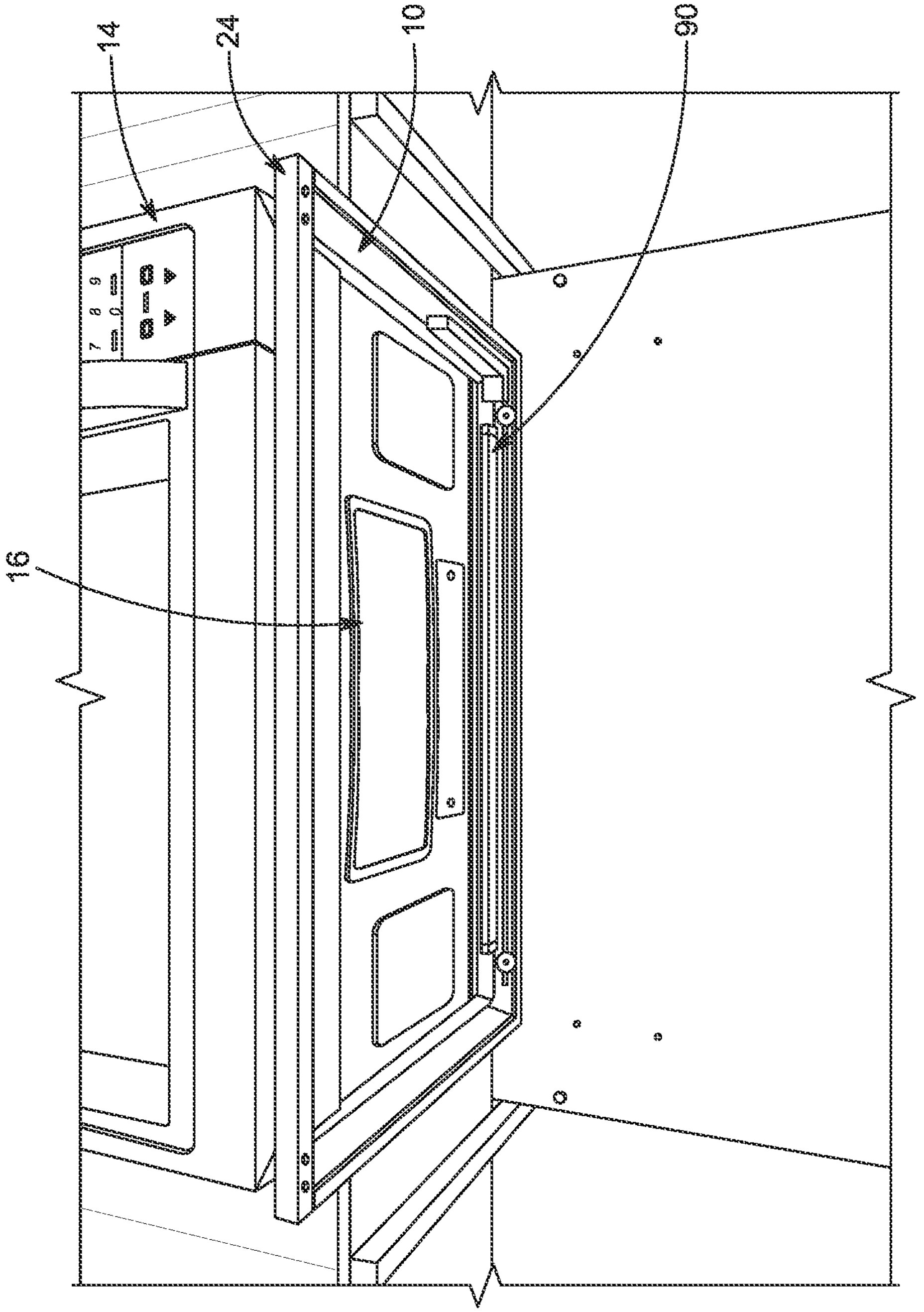
FIG. 15 is a perspective view showing a bottom of the microwave and the range hood of FIG. 1 in the collapsed-storage configuration.
Figure 16:
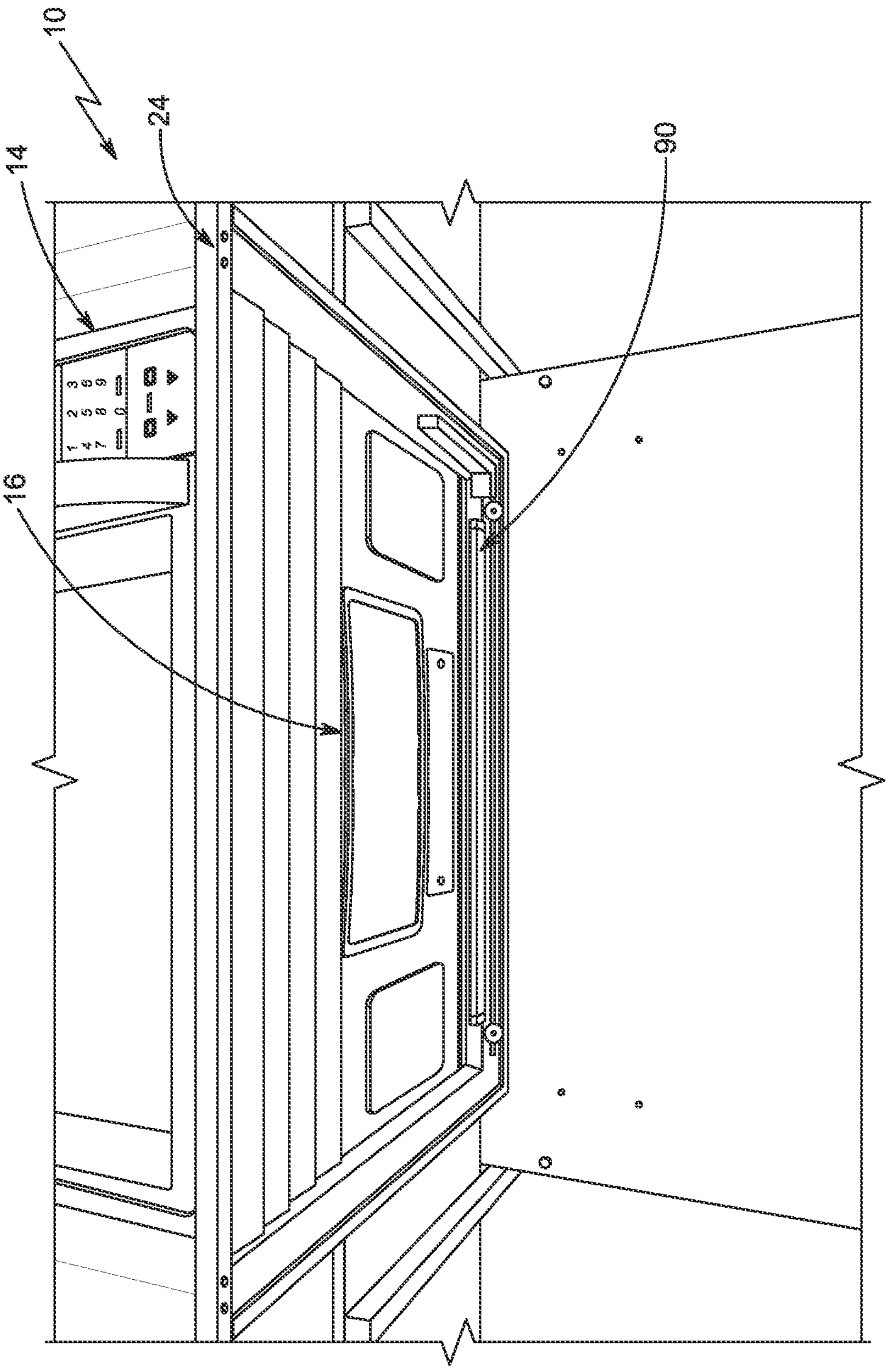
FIG. 16 is a perspective view similar to FIG. 15 showing the range hood of FIG. 1 in the expanded configuration.

The range hood may further include its own auxiliary light 90 as shown in FIG. 15. Although the auxiliary light 90 is shown being coupled to a rear end of the range-hood mount 18, the light 90 may be coupled to another part of the range-hood mount 18, the slides 20, 22, or the extendable hood 24 (i.e. within the front horizontal handle 29). A limit switch could be integrated into the range hood 10 that may automatically activate the light 90 when the extendable hood 24 is extended, and deactivate the light 90 when the extendable hood 24 is retracted. The light 90 may be powered by a wired connection or battery powered (replacement or rechargeable) or low voltage wiring run off of an adaptor that would be plugged into an existing outlet. In one example, the light 90 is an LED light for low power consumption when batteries are used, however any suitable light may be used.

The invention claimed is:

1. A range hood comprising:

a range-hood mount configured to couple to at least one of a microwave and a structure adjacent to the microwave, a pair of hood slides coupled to the range-hood mount, a portion of each hood slide being configured to move relative to the range-hood mount between a retracted position and an extended position, and an expandable hood extension coupled to the pair of hood slides and configured to move from a collapsed configuration, when the pair of hood slides are arranged in the retracted position, to an expanded configuration, when the pair of hood slides are in the extended position, wherein the expandable hood extension includes a plurality of panels that are stacked on top of one another in the collapsed configuration and that are at least partially offset relative to one another so as to be shiplapped in the expanded configuration.

2. The range hood of claim 1, wherein the microwave includes at least one vent inlet and the expandable hood extension is offset from the vent inlet in both the collapsed configuration and the expanded configuration.

3. The range hood of claim 1, wherein each of the slides includes a stationary rail mounted on the range-hood mount, a movable rail engaged with the stationary rail and configured to move relative to the stationary rail between the retracted and extended positions, and a panel holder coupled to the movable rail for movement therewith and coupled to the plurality of panels to control movement of the plurality of panels between the collapsed and expanded configurations.

4. The range hood of claim 3, wherein some of the panels move relative to panel holders as the expandable hood extension changes from the collapsed configuration to the expanded configuration.

5. The range hood of claim 3, wherein each panel holder is formed to define one or more slots that retain ends of the panels.

6. The range hood of claim 3, wherein each panel holder includes a first slot that receives an end of a first panel included in the plurality of panels and a second slot that receives an end of a second panel included in the plurality of panels, and wherein the first slot is sized to limit movement of the first panel relative to the panel holder so that the first panel moves with the panel holder as the hood slides change from the retracted position to the extended position and the second slot is sized to allow the panel holder to move relative to the second panel such that the end of the second panel travels through the second slot as the hood slides change from the retracted position to the extended position.

7. The range hood of claim 1, wherein the expandable hood extension has a first width in the collapsed configuration and a second width in the expanded configuration, the second width being greater than the first width.

8. The range hood of claim 1, wherein the microwave includes at least one vent inlet and the range-hood mount defines a central aperture configured to avoid blocking the vent inlet.

9. A range hood comprising:

a range-hood mount, a hood slide coupled to the range-hood mount, a portion of the hood slide being configured to move relative to the range-hood mount between a retracted position and an extended position, and an expandable hood extension coupled to the hood slide and configured to move from a collapsed configuration, when the hood slide is arranged in the retracted position, to an expanded configuration, when the hood slide is in the extended position, wherein the expandable hood extension includes a plurality of panels that are stacked on top of one another in the collapsed configuration and that are at least partially offset relative to one another so as to be shiplapped in the expanded configuration.

10. The range hood of claim 9, wherein the range hood further includes at least one vent inlet and the expandable hood extension is offset from the vent inlet in both the collapsed configuration and the expanded configuration.

11. The range hood of claim 9, wherein the hood slide includes a stationary rail mounted on the range-hood mount, a movable rail engaged with the stationary rail and configured to move relative to the stationary rail between the retracted and extended positions, and a panel holder coupled to the movable rail for movement therewith and coupled to the plurality of panels to control movement of the plurality of panels between the collapsed and expanded configurations.

12. The range hood of claim 11, wherein some of the panels move relative to panel holder as the expandable hood extension changes from the collapsed configuration to the expanded configuration.

13. The range hood of claim 11, wherein the panel holder is formed to define one or more slots that retain the panels.

14. The range hood of claim 11, wherein the panel holder includes a first slot that receives a first panel included in the plurality of panels and a second slot that receives a second panel included in the plurality of panels, and wherein the first slot is sized to limit movement of the first panel relative to the panel holder so that the first panel moves with the panel holder as the hood slide changes from the retracted position to the extended position and the second slot is sized to allow the panel holder to move relative to the second panel such that the second panel travels through the second slot as the hood slide changes from the retracted position to the extended position.

15. The range hood of claim 9, wherein the expandable hood extension has a first width in the collapsed configuration and a second width in the expanded configuration, the second width being greater than the first width.

16. A range hood comprising:

a range-hood mount configured to couple to at least one of a microwave and a structure adjacent to the microwave, and an expandable hood extension coupled to the range-hood mount and configured to move from a collapsed configuration to an expanded configuration, wherein the expandable hood extension has a first width in the collapsed configuration and a second width in the expanded configuration, the second width being greater than the first width, wherein the expandable hood extension includes a plurality of panels that are stacked on top of one another in the collapsed configuration and that are at least partially offset relative to one another so as to be shiplapped in the expanded configuration.

17. The range hood of claim 16, further comprising a pair of hood slides, each hood slide including a stationary rail mounted on the range-hood mount, a movable rail engaged with the stationary rail and configured to move relative to the stationary rail between the retracted and extended positions, and a panel holder coupled to the movable rail for movement therewith and coupled to the plurality of panels to control movement of the plurality of panels between the collapsed and expanded configurations.

* * * * *